United States Patent [19]

Messick

[11] 4,336,359

[45] Jun. 22, 1982

[54] NITRIC ACID STABILIZED THERMOSETTABLE RESINS

[75] Inventor: Virginia B. Messick, Lake Jackson, Tex.

[73] Assignee: The Dow Chemical Company, Midland, Mich.

[21] Appl. No.: 277,770

[22] Filed: Jun. 26, 1981

[51] Int. Cl.³ .............................................. C08L 63/00
[52] U.S. Cl. ................................... 525/531; 525/25; 525/922
[58] Field of Search .......................... 525/531, 922, 25

[56] References Cited

U.S. PATENT DOCUMENTS

| | | | |
|---|---|---|---|
| 2,646,416 | 7/1953 | Parker | 525/25 |
| 3,408,422 | 10/1968 | May | 526/220 |
| 3,683,045 | 8/1972 | Baldwin | 260/837 R |
| 3,736,289 | 5/1973 | Marshall | 528/112 |
| 3,775,513 | 11/1973 | Baker | 525/25 |
| 3,882,187 | 5/1975 | Takiyama | 525/531 |
| 3,980,731 | 9/1976 | Willemse | 526/208 |
| 4,129,609 | 12/1978 | Awaji | 525/3 |

FOREIGN PATENT DOCUMENTS 55-12127  3/1980  Japan.

Primary Examiner—Paul Lieberman

[57] ABSTRACT

Nitric acid, alone or in combination with phenothiazine, increases the storage life of vinyl ester resins or unsaturated polyesters without adversely suppressing the exotherm or affecting their curability.

12 Claims, No Drawings

NITRIC ACID STABILIZED THERMOSETTABLE RESINS

BACKGROUND OF THE INVENTION

Thermosettable resins generally have limited shelf lives, i.e., upon storage at ambient temperatures the resins undergo premature gelation which, of course, is undesirable. Generally, the tendency of a resin to gel increases as the storage temperature increases and is also dependent on the choice of reactants and on the kind and amount of monomer which is generally mixed with the resin.

Thermosettable vinyl ester resins, unsaturated polyesters or mixtures thereof have similar shelf life or storage stability problems. In the past, attempts with known stabilizing materials to prevent gelation have also resulted in an undesirable increase in the catalyzed gel times of the resins and adversely affected the curability of the resin. Typical of inhibitors taught by the art are certain hydroxyamines as proposed in U.S. Pat. No. 3,408,422 and phenothiazine taught in U.S. Pat. No. 3,683,045.

SUMMARY OF THE INVENTION

This invention relates to the unexpected finding that nitric acid when added in small proportions, greatly increases the storage life of thermosettable vinyl ester resins without suppressing the exotherm or adversely affecting their curability. A combination of nitric acid and phenothiazine exhibits a synergistic stabilizing effect.

DESCRIPTION OF THE INVENTION

The thermosettable polymer compositions include a vinyl ester resin or an unsaturated polyester or blends and mixtures of those two materials.

Vinyl ester resins are described in U.S. Pat. No. 3,367,992 wherein dicarboxylic acid half esters of hydroxyalkyl acrylates or methacrylates are reacted with polyepoxide resins. Bowen in U.S. Pat. Nos. 3,066,112 and 3,179,623 describes the preparation of vinyl ester resins from monocarboxylic acids such as acrylic and methacrylic acid. Bowen also describes alternate methods of preparation wherein a glycidyl methacrylate or acrylate is reacted with the sodium salt of a dihydric phenol such as bisphenol A. Vinyl ester resins based on epoxy novolac resins are described in U.S. Pat. No. 3,301,743 to Fekete et al. Fekete et al. also describe in U.S. Pat. No. 3,256,226 vinyl ester resins wherein the molecular weight of the polyepoxide is increased by reacting a dicarboxylic acid with the polyepoxide resin as well as acrylic acid, etc. Other difunctional compounds containing a group which is reactive with an epoxide group, such as an amine, mercaptan, and the like, may be utilized in place of the dicarboxylic acid. All of the above-described resins, which contain the characteristic linkages

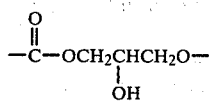

and terminal, polymerizable vinylidene groups, are classified as vinyl ester resins, and are incorporated herein by reference.

Briefly, any of the known polyepoxides may be employed in the preparation of the vinyl ester resins of this invention. Useful polyepoxides are glycidyl polyethers of both polyhydric alcohols and polyhydric phenols, epoxy novolacs, epoxidized fatty acids or drying oil acids, epoxidized diolefins, epoxidized diunsaturated acid esters as well as epoxides of unsaturated polyesters, as long as they contain more than one oxirane group per molecule.

Preferred polyepoxides are glycidyl polyethers of polyhydric alcohols or polyhydric phenols having weights per epoxide group of about 150 to 2000, most preferably those with an EEW in the range of 172-192. These polyepoxides are usually made by reacting at least about two moles of an epihalohydrin or glycerol dihalohydrin with one mole of the polyhydric alcohol or polyhydric phenol, and a sufficient amount of a caustic alkali to combine with the halogen of the halohyrin. The products are characterized by the presence of more than one epoxide group per molecule, i.e., a 1,2-epoxy equivalency greater than one.

Unsaturated monocarboxylic acids include acrylic acid, methacrylic acid, halogenated acrylic or methacrylic acid, cinnamic acid and the like and mixtures thereof. Also included within the term "unsaturated carboxylic acids" are the hydroxyalkyl acrylate or methacrylate half esters of dicarboxyl acids as described in U.S. Pat. No. 3,367,992 wherein the hydroxyalkyl group preferably has from 2 to about 6 carbon atoms.

A wide variety of unsaturated polyesters which are readily available or can be prepared by methods well-known to the art are also stabilized by oxalic acid. Such polyesters result from the condensation of polybasic carboxylic acids and compounds having two or more hydroxyl groups. Generally, in the preparation of suitable polyesters, an ethylenically unsaturated dicarboxylic acid such as maleic acid, fumaric acid, itaconic acid or the like is interesterified with an alkylene glycol or polyalkylene glycol having a molecular weight of up to 2000 or thereabouts. Frequently, dicarboxylic acids free of ethylenic unsaturation such as phthalic acid, isophthalic acid, adipic acid, succinic acid and the like may be employed within a molar range of 0.25 to as much as 15 moles per mole of the unsaturated dicarboxylic acid. It will be understood that the appropriate acid anhydrides when they exist may be used and usually are preferred when available.

The glycol or polyhydric alcohol component of the polyester is usually stoichiometric or in slight excess with respect to the sum of the acids. The excess of polyhydric alcohol seldom will exceed 20-25 percent and usually is about 10-15 percent.

These unsaturated polyesters may be generally prepared by heating a mixture of the polyhydric alcohol with the dicarboxylic acid or anhydride in the proper molar proportions at elevated temperatures, usually at about 150° to 225° C. for a period of time ranging from about 1 to 5 hours. The condensation reaction is contained until the acid content drops to about 2 to 12 percent as COOH and preferably from 4 to 8 percent.

Polymerization inhibitors, commonly called process inhibitors, such as t-butyl catechol, monomethyl ether of hydroquinone (MEHQ) or hydroquinone, are advantageously added to prevent premature polymerization during the preparation of the vinyl ester resin or the unsaturated polyester.

Vinyl ester/unsaturated polyester resin blends are also effectively stabilized. The blends may be prepared either by physically mixing the two resins in the desired proportions or by preparing said vinyl ester resin in the presence of said unsaturated polyester.

Preferably, the thermosettable resin phase comprises from 40 to 70 weight percent of the vinyl ester or polyester resin and from 60 to 30 percent of a copolymerizable monomer.

Suitable monomers include vinyl aromatic compounds such as styrene, vinyl toluene, divinyl benzene and the like. Other useful monomers include the esters of saturated alcohols such as methyl, ethyl, isopropyl, octyl, etc., with acrylic acid or methacrylic acid; vinyl acetate, diallyl maleate, dimethallyl fumarate; mixtures of the same and all other monomers which are capable of copolymerizing with the vinyl ester resin.

When concentrated nitric acid is used as the sole stabilizer, it is usually effective at a concentration of from 50 to 1000 parts per million (ppm). Higher amounts than 1000 ppm can be used and will improve the stability but may extend the gel time. Preferably, the amount to be used is from 50 to 400 ppm.

Nitric acid combined with phenothiazine exhibits a synergistic stabilizing effect. That synergistic effect is apparent with all ratios of the two ingredients that contain a significant amount of each.

The stabilizing agent is usually added to the prepared resin either before or after admixture with the vinyl monomer. Nitric acid can extend the shelf life of the resins 1.5 times or more. Also, it is less air dependent and is effective as a stabilizer under both aerobic and anaerobic conditions.

Catalysts that may be used for the curing or polymerization are preferably the peroxide and hydroperoxide catalysts such as benzoyl peroxide, lauroyl peroxide, cumen hydroperoxide, t-butyl hydroperoxide, methyl ethyl ketone peroxide (MEKP), t-butyl perbenzoate, and the like. The amount of the catalyst added will vary preferably from 0.1 percent to about 5 percent by weight of the resin phase.

Preferably, the cure of the resin can be initiated at room temperature by the addition of known accelerating agents or promoters, such as lead, potassium or cobalt naphthenate, N,N-dimethyl aniline, N,N-dimethyl-p-toluidine and the like usually in concentrations generally used in promoting the cure of vinyl ester resins and unsaturated polyesters. Typically, that concentration for the metallic naphthenates will be about 0.2 to 0.5 weight percent. The dimethyl aniline and dimethyl-p-toluidine will fall into the range of about 0.05 to 0.1 weight percent. The optimum amount will usually be known or readily determined by simple preliminary experiments. The promoted/catalyzed composition of resin/monomer, when uninhibited, will usually be converted to at least a gel state in a few minutes and cured to a solid state in 30 minutes to one or two hours. That time may vary widely depending upon the particular resin and vinyl monomer used, the catalyst/promoter system employed and its concentration, the temperature and other known factors. Similar results are observed when the usual process inhibitors are present that were added during the preparation of the resin. In amounts necessary to achieve that objective, such process inhibitors do not improve the storage stability of the composition to a significant extent. When used in amounts sufficient to provide storage stability, the gelation and cure rates are increased to unacceptable levels. It is an advantage of this invention that the process inhibitor can be employed in that minimum amount needed during resin preparation and that the stabilizing inhibitor systems of this invention can be employed to provide the desired storage stability without unacceptable effects on gelation and cure.

The benefits and advantages of the invention and the best mode for carrying out the same are illustrated in the following examples wherein all parts and percents are by weight unless otherwise specified.

EXAMPLE 1

The following vinyl ester resins were utilized:

Resin A

Bisphenol A was catalytically reacted with D.E.R. ® 331 epoxy resin at 150° C. under a nitrogen atmosphere for 1 hour to form a polyepoxide having an EEW of 535. After cooling to 110° C. additional D.E.R. ® 331 was added with methacrylic acid and hydroquinone and reacted to a carboxyl content of about 2.5–3 percent. Then maleic anhydride was added to the vinyl ester resin and reacted therewith. The final resin, diluted with styrene, contained approximately

| bisphenol A | 7.7% |
| D.E.R. ® 331 | 25.1% |
| methacrylic acid | 9.15% |
| D.E.R. ® 331 | 11.6% |
| maleic anhydride | 1.45% |
| styrene | 45% |

D.E.R. ® 331 is the diglycidyl ether of bisphenol A having an epoxy equivalent weight of 182–190.

Resin B

Vinyl ester resin was prepared by reacting about 1 equivalent of methacrylic acid with 0.75 equivalent of an epoxy novolac having an epoxide equivalent weight (EEW) of 175–182 (D.E.N. ® 438 epoxy novolac) and 0.25 equivalent of a glycidyl polyether of bisphenol A having an EEW of 182–190 (D.E.R. ® 331). The above reactants were heated to 115° C. with catalyst and hydroquinone present until the carboxylic acid content reached about 1 percent. The reactants were cooled and then styrene (containing 50 ppm of t-butyl catechol) was added. The final resin contained

| styrene | 36% |
| methacrylic acid | 17.7% |
| D.E.N. ® 438 | 27.6% |
| D.E.R. ® 331 | 9.7% |

In the following examples the compositions were evaluated according to the following procedures.

Stability at 55° C.—(a) Two ounces (59.1 cc) narrow mouth round amber bottles were filled to 70 percent volume with the resin composition. The bottles were capped with 20 mm plastic tin lined caps. The bottles were placed in an air circulated oven maintained at 55° C. Sample stability was checked daily by inverting the bottles. A sample is considered gelled and is removed from the oven when a layer of solid resin remains at the bottom of the bottle or when the sample appears stringy in consistency.

(b) The test is repeated with other samples except that before capping the head space is sparged with nitrogen.

(c) The tests (a) and (b) are repeated with other samples except that the bottles are filled to 94 percent volume with the resin composition.

(d) Gel time at 180° F.—(82.22° C.) One gram of benzoyl peroxide is mixed with one gram of styrene in a 4 ounce (108.2 cc) wide mouth bottle. One hundred grams of the resin composition is introduced and mixed on a shaker for 45 minutes. The catalyzed resin was poured into a test tube to a level of 3 inches (7.6 cm). The test tube was corked and allowed to stand for 5 to 10 minutes to be rid of air bubbles. A thermocouple is inserted into the center of the resin composition to one inch (2.54 cm) below the resin surface. The test tube is placed in a constant temperature bath maintained at 180° F. (82.22° C.) and the timers started when the resin reaches 150° F. (65.56° C.). One timer is stopped when the resin temperature has risen 10° F. (5.3° C.) above the constant temperature bath. That time is taken as the gel time. The test is continued until the recording pyrometer has run two minutes past the maximum temperature. The maximum temperature is the Peak Exotherm. The Peak Time is that time required for the resin temperature to rise from 150° F. (65.56° C.) to the Peak Exotherm.

(e) Gel time at 77° F. (25° C.)—One hundred grams of resin is placed into a 4 ounce (108.2 cc) wide mouth glass jar and held in a constant temperature bath for 45 minutes. 0.5 cc of 6 percent cobalt naphthenate in petroleum spirits is then mixed in thoroughly. To that is added 1.5 cc of 60 percent methyl ethyl ketone peroxide (MEKP) in dimethyl phthalate. The jar is placed on the gelometer stand with the probe extending into the resin. The timer is started and the time recorded when the timer stops and alarm is sounded. That time is the Gel Time. The jar is removed from the gelometer and a thermocouple placed about ¾ inch (1.9 cm) from the bottom of the jar. The temperature at which the sample breaks away from the side of the jar is the Peak Exotherm. The total elapsed time is the Peak Time.

(f) The tests were repeated using 0.2 cc cobalt naphthenate and 0.75 MEKP.

EXAMPLE 2

To Resin A containing 150 ppm phenothiazine there was added concentrated nitric acid. Various stability evaluations were determined by the aforementioned procedures.

A sample of Resin A containing 250 ppm MEHQ in place of the nitric acid was subjected to the identical determinations.

The results are listed in Table I.

By identical procedures, compositions of Resin A containing various inorganic and organic acids were evaluated. The acids employed were concentrated HCl; 20 percent $H_2SO_4$; 85 percent $H_3PO_4$; acetic acid and trichloroacetic acid included at 100 and 200 ppm. All of those compositions failed to provide the advantageous benefits of nitric acid.

TABLE I

| Sample | ppm Conc. $HNO_3$ | 55° C. Stability 70% Filled Air | 55° C. Stability 70% Filled $N_2$ | 55° C. Stability 94% Filled Air | 55° C. Stability 94% Filled $N_2$ | 43.3° C. Stability 94% Filled Air | 43.3° C. Stability 94% Filled $N_2$ |
|---|---|---|---|---|---|---|---|
| 1 | 200 | 11 | 10 | 7 | 6 | 19 | 19 |
| 2 | 300 | 11 | 11 | 8 | 9 | >23 | >23 |
| 3 | 400 | 12 | 14 | 9 | 9 | >25 | >25 |
| 4 | 100 | 10 | 7 | 6 | 7 | — | 18 |
| 5 | 200 | 13 | 9 | 6 | 6 | 18 | 20 |
| Control | 250 ppm MeHq | 9 | 5 | 4 | 4 | 12 | 14 |

EXAMPLE 3

To Resin B was added 100 or 200 ppm concentrated nitric acid. The described gel determinations were made with the results listed in Table II.

When the nitric acid was substituted with HCl; 20 percent $H_2SO_4$; or acetic acid the benefits of nitric acid were not realized. When $H_3PO_4$ was substituted, storage stability was increased but gel times were extended beyond practical working limits.

TABLE II

| Sample | Stabilizing Inhibitor (ppm) Ptz | Stabilizing Inhibitor (ppm) Nitric Acid | 25° C. Gel(e) Gel (min) | 25° C. Gel(e) Peak (min) | 25° C. Gel(e) Peak (°C.) | 25° C. Gel(f) Gel (min) | 25° C. Gel(f) Peak (min) | 25° C. Gel(f) Peak (°C.) | 82.2° C. Gel(d) Gel (min) | 82.2° C. Gel(d) Peak (min) | 82.2° C. Gel(d) Peak (°C.) |
|---|---|---|---|---|---|---|---|---|---|---|---|
| 6 | 150 | 100 | 11.8 | 15.5 | 378 | 54.0 | 64.5 | 373 | 12.7 | 14.2 | 413 |
| 7 | 150 | 200 | 12.9 | 17.4 | 405 | 59.8 | 70.0 | 358 | 12.8 | 14.1 | 408 |

What is claimed is:

1. A thermosettable resin composition having improved storage stability, said composition comprising a vinyl ester resin, an unsaturated polyester or a mixture thereof and a stabilizing amount of nitric acid.

2. The composition of claim 1 wherein said composition contains a vinyl monomer as a reactive diluent.

3. The composition of claim 2 wherein said vinyl monomer is styrene.

4. The composition of claim 1 wherein said nitric acid is present in an amount of 50 to 1000 parts per million based on the weight of resin and vinyl monomer.

5. The composition of claim 1 wherein said vinyl ester resin is the reaction product of essentially equivalent amounts of an unsaturated monocarboxylic acid and an epoxy novolac.

6. The composition of claim 5 wherein said monocarboxylic acid is methacrylic acid.

7. The composition of claim 1 wherein said vinyl ester resin is the diester of an unsaturated monocarboxylic acid and a diglycidyl ether of a polyhydric alcohol or a polyhydric phenol.

8. The composition of claim 7 wherein said diglycidyl ether is the diglycidyl ether of a bisphenol.

9. The composition of claim 8 wherein said monocarboxylic acid is methacrylic acid.

10. The composition of claim 8 wherein said bisphenol is bisphenol A.

11. The composition of claim 1 wherein said composition contains a reinforcing material or filler.

12. The composition of claim 1 wherein the nitric acid is present together with phenothiazine.

* * * * *